D. SWARTZ.
Plow.
No. 9,061. 
Patented June 22, 1852.
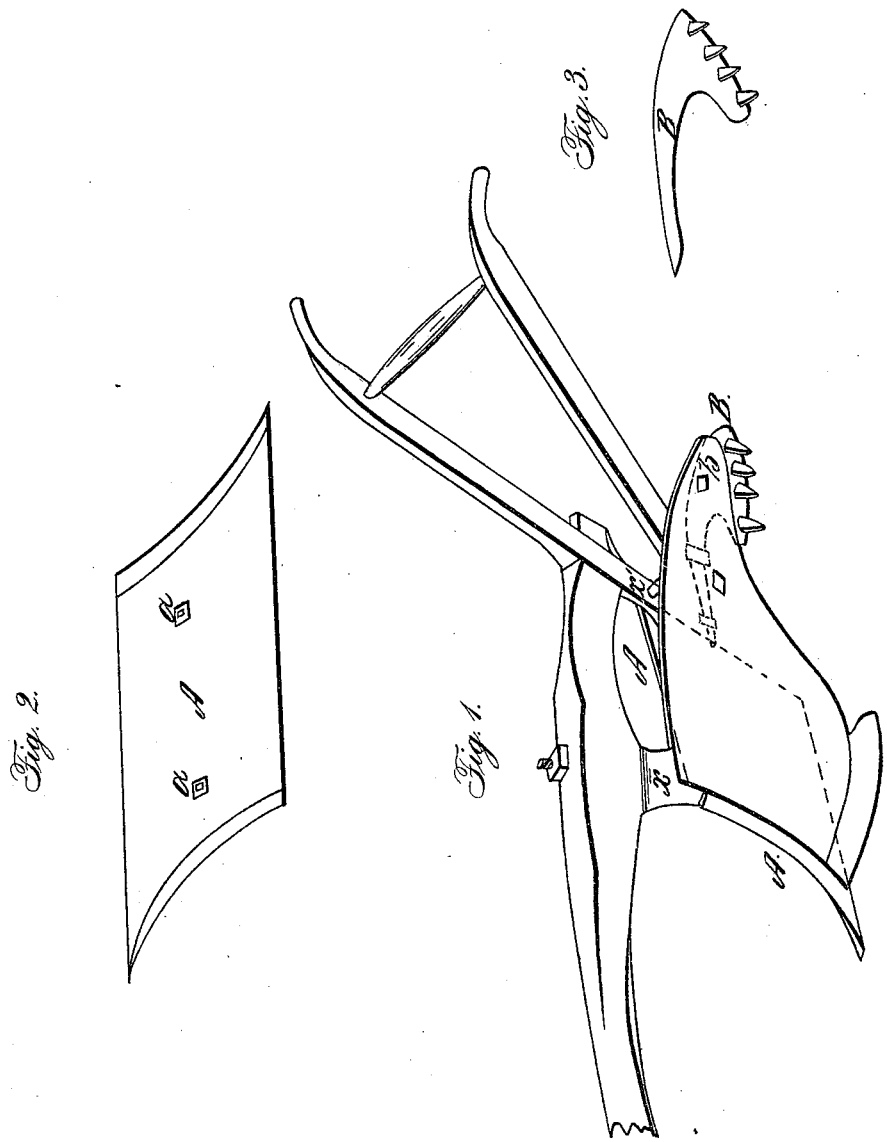

UNITED STATES PATENT OFFICE.

DAVID SWARTZ, OF TOM'S BROOK, VIRGINIA.

IMPROVEMENT IN PLOWS.

Specification forming part of Letters Patent No. 9,061, dated June 22, 1852.

*To all whom it may concern:*

Be it known that I, DAVID SWARTZ, of Tom's Brook, in the county of Shenandoah and State of Virginia, have invented a certain new and useful Improvement in Plows; and I do hereby declare that the following is a full, clear, and exact description thereof, reference being had to the accompanying drawings, forming a part of this specification, in which—

Figure 1 is a perspective view; Fig. 2, detached view of reversible plate, and Fig. 3 detached view of rake.

My plow is of that kind with reversible points—that is to say, the landside being formed of a single movable plate, the two ends of which are shaped into points or cutters and exactly adapted to the mold-board and share, so that it can be shifted, end for end, at pleasure. It is bolted into the standard and foot of the helve and can be easily removed for the purpose of sharpening, &c.

My improvement consists in adapting and combining with the rear end of the mold-board at about the angle represented a comb or rake, for the purpose of breaking and separating the clods of earth thrown up from the furrow simultaneously with the breaking up of the ground when preparing it for seeding, whereby the necessity of using a harrow after plowing is avoided.

A is the reversible plate, with the points and cutters formed on its ends, which is adapted to the other parts of the plow, and when bolted on, as represented in Fig. 1, constitutes the landside. It may be made of wrought-iron and the points and cutters faced with steel, or it may be made entirely of steel. It is bolted on, as before stated, to the standard or shank $xx$, foot of the helve $x'$, by bolts passing through the holes $a\,a$, and it can be made to fit any size plow.

B is the rake or comb, which is iron, and formed as represented in Fig. 3. It slides into a bracket on the inner side of the mold-board, as represented in dotted lines, and is secured in its place by the pin $b$; or it may be secured in any other convenient and suitable manner.

Having thus fully described and represented my improved plow, what I claim therein as new, and desire to secure by Letters Patent, is—

Combining a plow and harrow in one implement—that is to say, attaching a comb or rake or its equivalent to the rear and upper end of the mold-board, to comb out and pulverize the soil on the bottom of the furrow as it is turned up, substantially as set forth.

In testimony whereof I have hereunto signed my name before two subscribing witnesses.

DAVID SWARTZ.

Witnesses:
GEO. R. WEST,
THOS. DONOHO.